Jan. 12, 1926.
1,569,612
A. BURROWS
THROTTLE CONTROL FOR AUTOMOBILES
Filed Dec. 13, 1924
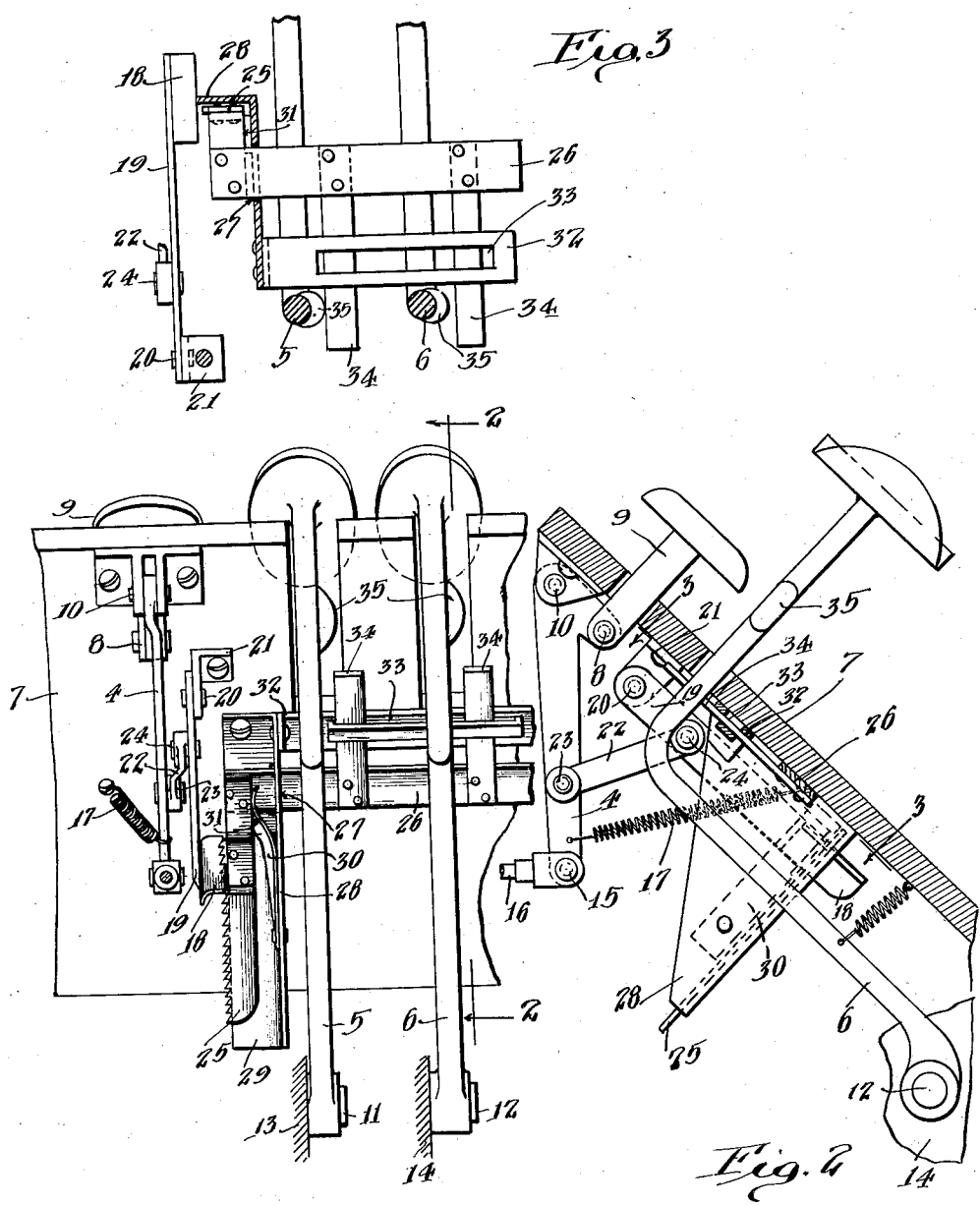
Inventor
Allen Burrows
By Lyon & Lyon
Attorneys Patented Jan. 12, 1926.

1,569,612

UNITED STATES PATENT OFFICE.

ALLEN BURROWS, OF LOS ANGELES, CALIFORNIA.

THROTTLE CONTROL FOR AUTOMOBILES.

Application filed December 13, 1924. Serial No. 755,665.

*To all whom it may concern:*

Be it known that I, ALLEN BURROWS, a citizen of the United States, residing at Los Angeles, in the county of Los Angeles and State of California, have invented a new and useful Throttle Control for Automobiles, of which the following is a specification.

This invention relates to throttle controls for the engines of automobiles and an object of the invention is to make provision for releasably holding the throttle operating member in different positions and to automatically release said member by operation of either the brake pedal or the clutch pedal.

Another object of the invention is to provide for greater comfort of the drivers of automobiles, this invention making it unnecessary to keep the foot on the foot throttle or accelerator, as it is generally termed.

As is well known, to drive an automobile at a uniform speed over a comparatively level road, when the foot throttle control is being employed, the driver must maintain his foot in one position on the accelerator. This is very tiresome, and, besides, is more or less injurious to the muscles of the foot and leg. By the use of this invention, the accelerator may be set, by pressure of the foot, to give any desired throttle opening and the foot may then be rested upon the floor or against the brake pedal ready for instant depression of said pedal so that, when it becomes necessary to apply the brake, actuation of the brake pedal will release the accelerator, thus automatically effecting closing of the throttle by actuation of the brake pedal. Release of the accelerator is also automatically accomplished with this invention by actuation of the clutch pedal so that, if the clutch should be thrown out without first closing the throttle, the engine will not race.

The accompanying drawings illustrate the invention:

Fig. 1 is a rear elevation of a throttle control constructed in accordance with the provisions of this invention, the same being shown mounted upon a fragment of the foot board of a motor vehicle.

Fig. 2 is an elevation of Fig. 1, partly in section, from the irregular line indicated by 2—2, Fig. 1.

Fig. 3 is a fragmental view, partly in section, from the line indicated by 3—3, Fig. 2.

A throttle operating member is indicated at 4, a clutch operating pedal at 5 and a brake operating pedal at 6. This throttle operating member and pedals may be of the usual or any preferred construction and may be taken as typical of the corresponding engine control elements employed on motor vehicles. In this instance, the member 4 is a lever and is mounted on the foot board 7 for operation by the driver's foot, but it is to be understood that said lever 4 may be placed in convenient position on the automobile for operation by the hand of the driver instead of by his foot.

To the lever 4 is pivoted at 8 an accelerator pedal 9. The lever 4 is pivotally connected at 10 to the under-face of the foot board 7 and the pedals 5, 6 are pivotally connected at 11, 12, respectively, to any suitable portions 13, 14 of the motor vehicle. The rods or other connections by which the pedals 5, 6 are connected to the clutch and brakes of the vehicle are not shown in the drawings as they are well understood in the art relating to motor vehicles. Pivotally connected at 15 to the lever 4 is a rod 16 which connects with the throttle of the carburetor in a manner well understood in this art.

The throttle operating rod 16 is normally held in position to close the throttle by a coil spring 17 which, in this instance, is connected at one end to the lever 4 and at its opposite end to the foot board 7. Connected by any suitable means to the throttle operating lever 4 is a detent 18. In this instance the detent 18 is mounted on a lever 19 which is fulcrumed at 20 on a bracket 21 fixed to the under-face of the foot board 7. The levers 4, 19 are connected by a link 22 which is pivoted at 23 to the lever 4 and at 24 to the lever 19.

The detent 18 is adapted to engage a toothed member 25 which projects from one end of a movably mounted member 26. The movably mounted member 26, in this instance, is slidably mounted on the under-face of the foot board 7 and may be termed a slide. Though the drawings show an arrangement in which the detent 18 is mounted on the lever 19 and the toothed member 25 is mounted on the member 26, it is obvious that said detent and toothed member could be interchanged without affecting their mode of operation and, accordingly, the invention includes either arrangement.

The member 26 slides through a slot 27 in a bracket 28 that is stationarily mounted on the under-face of the foot board 7 and the bracket 28 has a stripping member 29 adapted to engage the detent 18 and aid in disengagement of said detent from the teeth of the member 25 when said member 25 is pulled away from the detent by shifting the member 26 to the right in Fig. 1. A spring 30 is fixed to the bracket 28 and bears against a shoulder 31 on the member 26 so as to yieldingly hold the member 26 in position to project the teeth of the member 25 beyond one edge of the stripping member 29 so that when the pedal 9 is actuated the detent 18 will selectively engage with the teeth of the member 25, thus holding the throttle operating member in any desired position.

The bracket 28 has an arm 32 forming a slotted guide 33 through which extend fingers 34 of the member 26. The fingers 34 and slotted guide 33 aid in slidably mounting the member 26.

To effect retraction of the member 26, so as to release the toothed member 25 from the detent 18, there are provided suitable means that are actuated by the pedals 5, 6. In this instance these means are of very simple construction, consisting of shoulders 35, one mounted on the pedal 5 and the other on the pedal 6. When the member 25 engages the detent 18, the fingers 34 are in the paths of movement of the shoulders 35, said paths of movement being those along which the shoulders 35 move when the pedals 5, 6 are being depressed to throw out the clutch and set the brakes.

The construction of the lever 4 and its fulcrum 10 is preferably such that pressure of the driver's foot on the pedal 9 toward the left in Fig. 1 will cause engagement of the detent 18 with the member 25 and pressure of his foot toward the right in Fig. 1 will release the detent from said member 25. The spring 17 is shown, in this instance, mounted in a manner to tend to hold the detent 18 away from the member 25 so that the driver, by pressing his foot straight downward upon the pedal 9, can operate the throttle in the usual manner, that is to say, open and close the throttle by movement of his foot up and down.

The invention described above operates as follows:

The driver applies his foot to the pedal 9 and depresses the same to open the throttle and, if he desires to maintain the throttle in the open position to which he has operated it, he will exert pressure toward the left in Fig. 1 so as to engage the detent 18 with the toothed member 25. He may then remove his foot from the pedal 9. If he desires to effect closing of the throttle without operating the clutch or brake, he will place his foot on the pedal 9 and exert pressure toward the right in Fig. 1, thus moving the detent 18 away from the toothed member 25.

Assuming that the throttle is open and is being held open by engagement of the detent 18 with the toothed member 25 and that an emergency requires instant slowing up or stoppage of the vehicle, the driver will depress the brake pedal 6, thus operating the brakes and, at the same time, causing the shoulder 35 on the lever 6 to engage the adjacent finger 34 and move said finger to the right in Fig. 1, thus withdrawing the toothed member 25 from the detent 18 so as to release said detent, whereupon the spring 17 will retract the lever 4 and close the throttle valve, not shown.

I claim:

1. A throttle control for automobiles comprising, a throttle operating member shiftable in different planes, means to releasably hold the throttle operating member in different positions when in one of said planes, movement of the operating member in the first mentioned plane releasing it from the holding means, a pedal, means operated by depression of the pedal to release the operating member holding means when the operating member is in the first mentioned plane, and a spring to retract the throttle operating member when said member is released.

2. A throttle control for automobiles comprising, a throttle operating member, means to releasably hold the throttle operating member in different positions, a slidably mounted member to release the holding means, a pedal, means operated by depression of the pedal to engage and move the slidably mounted member, and a spring to retract the throttle operating member when said member is released.

3. A throttle control for automobiles comprising, a throttle operating member, a member adapted to be operated at will by the driver, a detent connected with one of said members, a toothed member connected with the other of said members and selectively engaged by the detent by operation of the throttle operating member, said detent and toothed member being disengaged by operation of the second mentioned member, and a spring to retract the throttle operating member when the detent and toothed member are disengaged.

4. A throttle control for automobiles comprising, a throttle operating member, means to releasably hold the throttle operating member in different positions, a plurality of pedals, means operated by depression of either pedal to release the operating member holding means, and a spring to retract the throttle operating member when said member is released.

5. A throttle control for automobiles comprising, a throttle operating member, means to releasably hold the throttle operating member in different positions, a slidably mounted member to release the holding means, a plurality of pedals, means operated by depression of either of the pedals to engage and move the slidably mounted member, and a spring to retract the throttle operating member when said member is released.

6. A throttle control for automobiles comprising, a throttle operating member, means to releasably hold the throttle operating member in different positions, a plurality of pedals, a shoulder on each pedal engageable with the holding means by operation of said pedal to release the holding means, and a spring to retract the throttle operating member when released.

7. A throttle control for automobiles, comprising, a throttle operating member, a plurality of members adapted to be independently operated at will by the driver, a detent and a toothed member between the first and second mentioned members and selectively engaged by operation of the throttle operating member, said detent and toothed member being disengaged by operation of either of the second mentioned members, and a spring to retract the throttle operating member when the detent and toothed member are disengaged.

8. A throttle control for automobiles comprising, two members mounted for horizontal motion, one of said members being movable up and down to different positions and the other constructed to selectively hold the first mentioned member in the different positions, a throttle-operating member controlled by the first mentioned member, a pedal operable to engage and move the second mentioned member away from the first mentioned member, and a spring yieldingly holding the second mentioned member toward the first mentioned member.

9. A throttle control for automobiles comprising, a throttle operating member, a plurality of pedals, means between the throttle operating member and the pedals operating upon movement of the throttle operating member in one direction to hold said throttle operating member in the position to which it has been moved and operating upon depression of either of the pedals to release the throttle operating member, and a spring to move the throttle operating member in the opposite direction when it is released.

10. A throttle control for automobiles, comprising a throttle operating member, a member adapted to be operated at will by the driver, interengaging members adapted when engaged to prevent relative motion in one direction of said members, one of the interengaging members being connected with the throttle operating member and the other with the second mentioned member, and one of the interengaging members constructed for selective engagement by the other of said interengaging members, operation of the second mentioned member pulling one of the interengaging members in a direction away from the other, a stripping member to hold said other inter-engaging member against movement in said direction, and a spring to retract the throttle operating member when the interengaging members are disengaged.

Signed at Los Angeles, California, this 5th day of December, 1924.

ALLEN BURROWS.